Aug. 9, 1938.    W. L. WHITSON    2,126,238
CONTROL SYSTEM FOR ELECTRICALLY OPERATED APPARATUS
Filed Dec. 20, 1935    2 Sheets-Sheet 1
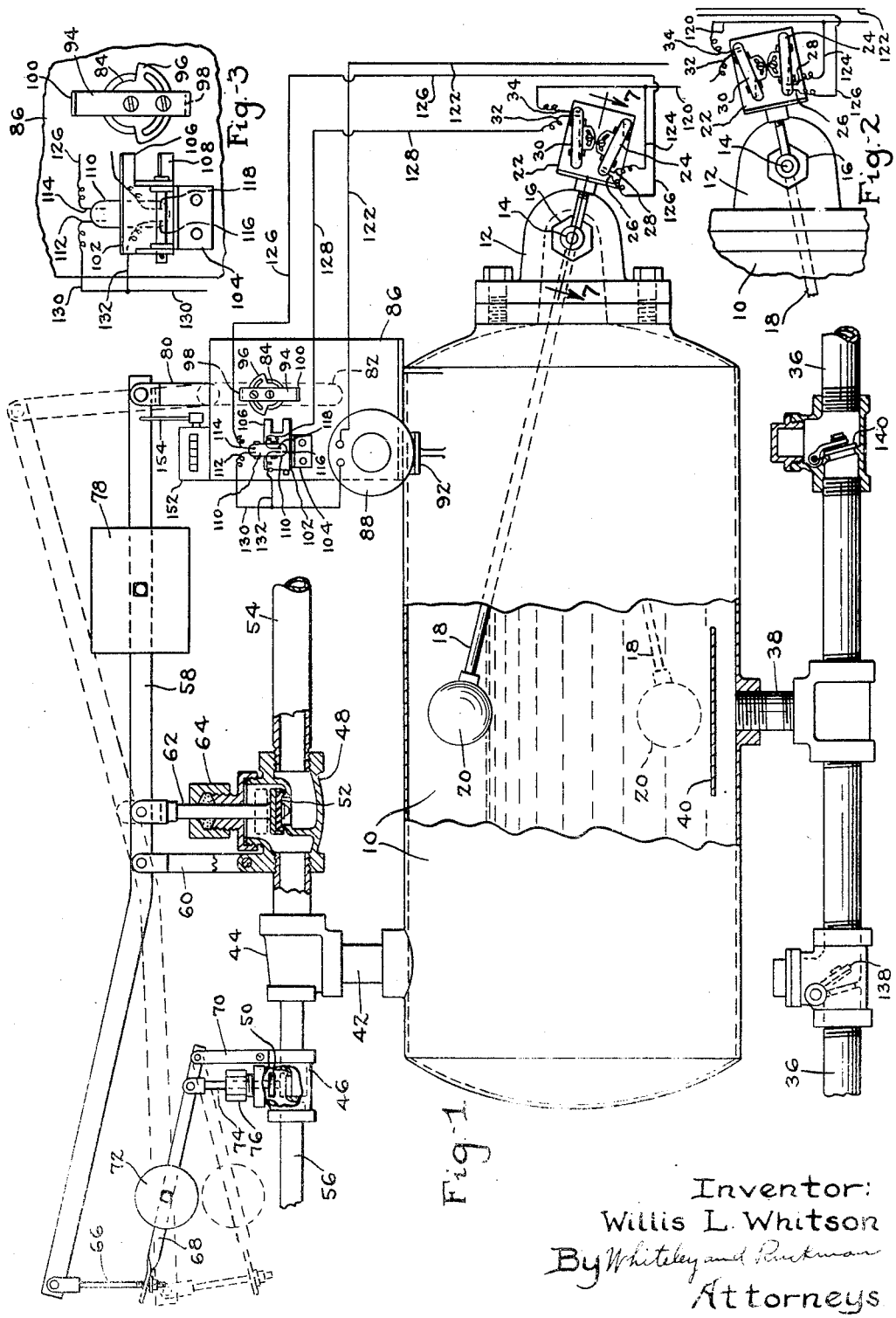
Inventor:
Willis L. Whitson
By Whiteley and Ruckman
Attorneys

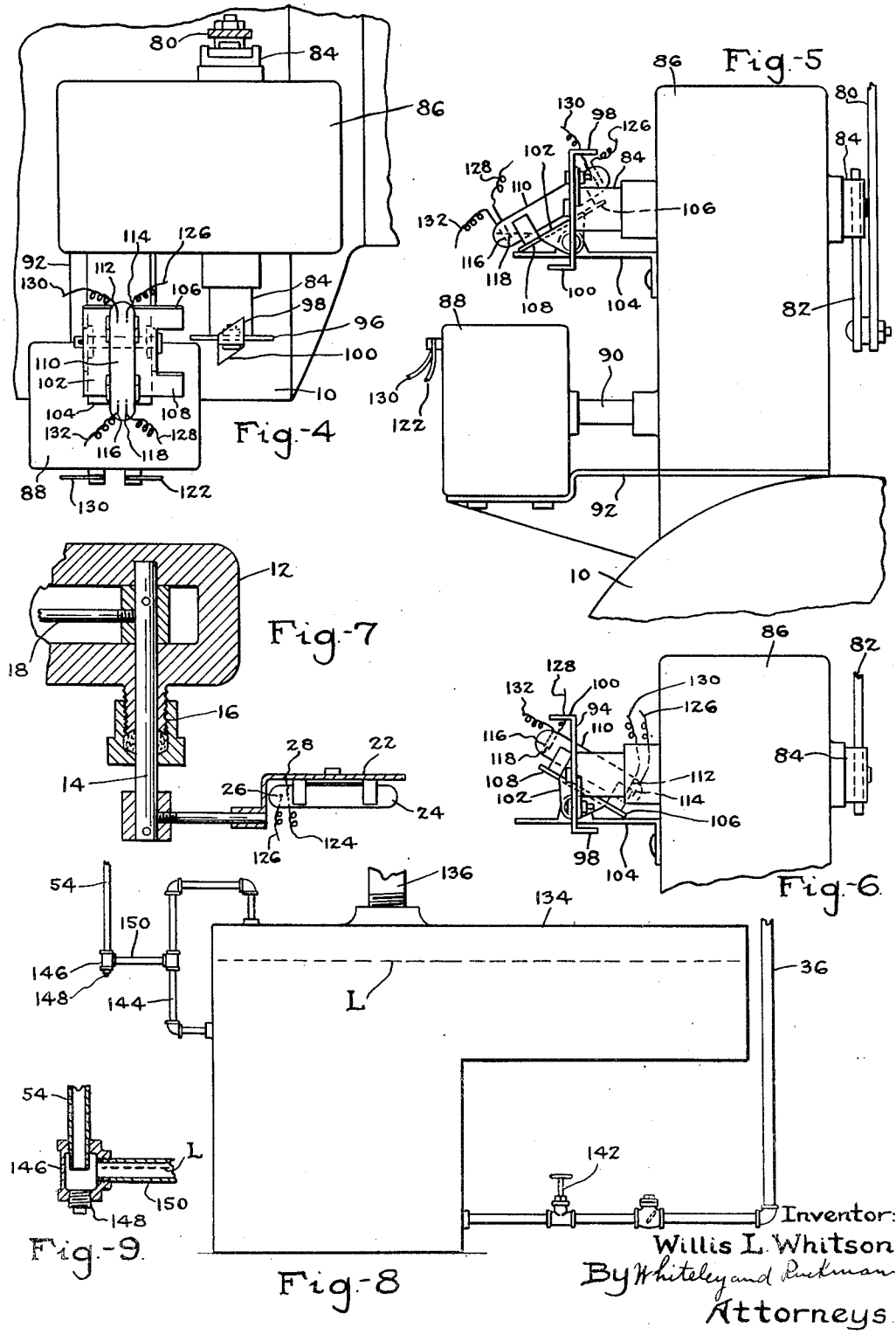

Patented Aug. 9, 1938

2,126,238

UNITED STATES PATENT OFFICE 2,126,238

CONTROL SYSTEM FOR ELECTRICALLY OPERATED APPARATUS

Willis L. Whitson, Minneapolis, Minn.

Application December 20, 1935, Serial No. 55,458

5 Claims. (Cl. 172—239)

My invention relates to an electrically operated direct return steam trap. An object of the invention is to provide a device of this character involving a steam trap tank having a steam inlet valve and a relief valve actuated into alternate open and closed position by electrical means and controlled by a float located within the tank so arranged and connected that its rise and fall makes and breaks an electric circuit by means of switches. When the trap tank fills up to the proper level with liquid the supply of which is to be controlled as needed, the switch device associated with the float closes an electric circuit, thereby energizing electrical means which operates to open the steam inlet valve so as to admit steam to the trap tank and at the same time close the relief valve. Another object is to so arrange and construct the switches which control the operation of the device that they are not liable to get out of proper relationship with the liquid level in the trap tank.

The novel features which I believe to be characteristic of my invention are set forth with particularity in the appended claims. The invention itself, however, both as to its organization and method of operation, together with additional objects and advantages thereof will be best understood from the following description of a specific embodiment when read in connection with the accompanying drawings in which, Fig. 1 is a side elevational view partly in section and showing a wiring diagram.

Fig. 2 is a detail view of a switch device.

Fig. 3 is a detail view of another switch device.

Fig. 4 is a top plan view showing a gear casing with the switch device of Fig. 3 and electrical operating means associated therewith.

Fig. 5 is an end view of what is shown in Fig. 4.

Fig. 6 is a view similar to Fig. 5, but showing the switch device in its other position.

Fig. 7 is a view in section on the line 7—7 of Fig. 1.

Fig. 8 is a side elevational view on reduced scale showing a steam boiler and a manner of utilizing my device in connection therewith.

Fig. 9 is a sectional view of a steam trap device for controlling the supply of steam to the steam trap tank.

Referring to the construction shown in the drawings which illustrate the principle of operation of my device, the numeral 10 designates a steam trap tank having an extension 12 secured to one end thereof in fluid tight manner. A pivot shaft 14 extends through the side of the extension 12 being attached in fluid tight manner by a stuffing box 16. A rod 18 is secured to the pivot shaft 14 and this rod extends into the body of the tank 10 with a float 20 secured to the free end of the rod 18. As best shown in Fig. 7, a support 22 is secured to the outer end of the pivot shaft 14 and the support carries a switch device consisting of two switches which are shown as being adjustable mercury switches. One of these switches identified as 24 has two terminals 26 and 28 which are contacted by the mercury as shown in Fig. 2 when the float 20 is in down position. The other one of these switches identified as 30 has two terminals 32 and 34 which are contacted by the mercury as shown in Fig. 1 when the float 20 is in up position as shown in Fig. 1.

A pipe 36 connected with any suitable source of liquid supply has a branch 38 connected with the bottom of the tank 10, a baffle 40 being placed above the connection with the bottom. A pipe section 42 is connected with the top of the tank 10, this section having a T member 44, one side of which is connected to a valve casing 46 and the other side of which is connected to a valve casing 48. The casing 46 contains a relief valve 50 while the casing 48 contains a steam inlet valve 52 which when moved upwardly into open position indicated in dotted lines, allows steam coming through a pipe 54 connected to the casing to pass into the tank 10. The relief valve 50 when in open position as indicated in full lines allows steam to escape from the tank 10 to atmosphere through a tube 56 connected to the valve casing 46. A lever 58 is intermediately pivoted to a standard 60 shown as extending up from the casing 48. On one side of the pivot, the lever 58 is pivotally attached to the upper end of a valve stem 62 extending through a stuffing box 64 and having the valve 52 secured to the lower end of the stem. On the other side of the pivot, an end of the lever 58 is connected by a link 66 to one end of a lever 68, the other end of which is pivoted to a standard 70 shown as extending up from the casing 46. The lever 68 carries a weight 72 and is pivotally attached to the upper end of a valve stem 74 extending through a stuffing box 76 and having the valve 50 secured to the lower end of the stem. The arm of the lever to which the stem 62 is attached carries a weight 78 and to the end of this arm is pivotally attached a link 80 whose lower end is attached to a crank 82 carried by a shaft 84 extending through a casing 86.

The shaft 84 is rotated by electrical operating means which in the embodiment shown is an electric motor 88 whose shaft 90 is geared in any suitable manner as by reduction gearing to the shaft 84. The motor 88 is supported by a bracket 92. The end of the shaft 84 carries an arm member 94 adjustably secured by a segment member 96 as best shown in Figs. 1 and 3. The opposite ends of the member 94 are bent angularly to form flanges 98 and 100 which are bent respectively toward and away from the casing 86. These flanges serve to tilt alternately in opposite directions a support 102 pivotally mounted on a bracket 104. The support 102 is provided with two wings 106 and 108. From Fig. 4 it will be understood that when the shaft 84 is given rotative movement, the flange 98 will strike the wing 106 and tilt the support 102 into the position shown in Fig. 6, and upon further rotative movement of the shaft 84, the flange 100 will strike the wing 108 and tilt the support 102 into the position shown in Fig. 5. The support 102 carries a two circuit mercury switch tube 110 having two terminals 112 and 114 at one end and two terminals 116 and 118 at the other end.

The wiring will now be described particularly in connection with Figs. 1 and 2 from which it will be seen that an electrical supply system has two wires 120 and 122. The wire 120 is connected to the terminal 34 and connected by a branch wire 124 with the terminal 28. The wire 122 is connected to one terminal of the electric operating means or motor 88. The terminal 26 is connected by a wire 126 with the terminal 114. The terminal 32 is connected by a wire 128 with the terminal 118. The terminal 112 is connected by a wire 130 with the other terminal of the operating means. The wire 130 is connected by a branch wire 132 with the terminal 116.

For illustrative purposes, the return steam trap device will be described in connection with a boiler 134 from which steam may be taken for various purposes in any suitable manner as by a take-off pipe 136. By referring to Fig. 1, it will be seen that the supply pipe 36 in the portion leading to the tank 10 is provided with a forwardly opening check valve 138 and in the portion leading from the tank 10 is provided with a forwardly opening check valve 140. By referring to Fig. 8 it will be seen that the pipe 36 leads into the lower portion of the boiler 134 and is provided with a shut off cock 142. The top of the boiler 134 is connected by an angular pipe 144 with a point of the boiler below the desired liquid level indicated at L. The lower end of the steam pipe 54 extends into a steam trap casing 146 to an intermediate position therein. The bottom of this casing is provided with a screw plug 148 and the side of the casing is connected by a pipe 150 with the vertical portion of the pipe 144. It will, therefore be understood that steam will not pass up the pipe 54 until the level of liquid in the boiler and pipe 150 falls below the lower end of the pipe 54. By referring to Fig. 1, it will be seen that I may provide a stroke counting device 152 which is connected by a link 154 with the lever 58 so the counting device will be operated each time the tank 10 empties and thus meter the liquid which is delivered into the boiler.

The operation and advantages of my invention will be readily understood in connection with the foregoing description and the accompanying drawings and will be summarized in connection with the employment of the device in connection with a boiler to provide a completely automatic boiler feed system for maintaining a proper and substantially constant liquid level in the boiler. Referring to the position shown in Fig. 1, the lever 58 is in the position shown in full lines with the relief valve 50 open and the steam inlet valve 52 closed so that the liquid is coming into the tank 10 through the pipe 56 and the float is being raised. When the float 20 reaches its top position, the mercury in the tube 30 makes contact with the electrodes 32 and 34 so that a circuit is completed through these electrodes, the wire 120, the wire 128, the electrodes 116 and 118 of the tube 110, the wire 132, the wire 130, the terminals of the motor 88 and the wire 122. This starts the motor which causes the shaft 84 to make a half rotation thereby bringing the lever 58 from the full line position shown in Fig. 1 so as to close the relief valve 50 and open the inlet valve 52. At the same time, by the means previously described, the tube 110 is tilted from the position of Fig. 5 into the position of Fig. 6 so that contact of mercury with the electrodes 116 and 118 is broken and the motor stops. If now the liquid in the boiler 134 needs replenishing, or in other words if the liquid level has dropped so as to be below the lower end of the pipe 54 in the trap 146, then steam passes from the pipe 150, up the pipe 54 past the valve 52 and into the top of the tank 10 thereby forcing the liquid therein out through the pipe 36 into the boiler. It is to be noted that at this time, the check valve 138 is closed and the check valve 140 is open. When the float 20 drops to the position shown in dotted lines in Fig. 1, the electrodes 26 and 28 as shown in Fig. 2 are contacted by the mercury. This completes a circuit through these electrodes, the wire 126, the electrodes 112 and 114 of the tube 110, the wire 130, the terminals of the motor 88 and the wire 122. This starts the motor which causes the shaft 84 to make a half rotation thereby bringing the lever 58 back to the full line position of Fig. 1 so as to open the relief valve 50 and close the inlet valve 52. At the same time, the tube 110 is tilted from the position of Fig. 6 into the position of Fig. 5 so that contact of mercury with the electrodes 112 and 114 is broken and the motor stops. The device is now set in position for the tank 10 to refill for repeating the operation as previously described.

Summarizing the operation more briefly, steam is admitted at the top of the trap tank 10 where it acts expansively to discharge the contents of the tank to the desired point of disposal. When the contents of the trap have been discharged, the float 20 assumes a position at the bottom of the tank 10 thereby closing an electric circuit which energizes the electrical operating means. This electrical means closes the steam inlet valve and opens the relief valve, permitting the trap tank to again fill up with the liquid. The steam connection to the trap tank is made at a point in the equalizing pipe 144 corresponding to the liquid level in the boiler. When the liquid rises in the equalizing pipe and covers the lower end of the pipe 54 leading to the trap tank, equalization of pressures does not take place, and the tank cannot discharge its load until the liquid in the equalizing pipe falls to a point which permits steam to flow to the tank, thereby establishing a complete equalization of pressure in the tank and boiler and permitting the liquid to flow from the tank into the boiler by gravity. The liquid entering the trap tank may be taken from any available source having a lower pressure than that which exists in the boiler.

Although I have shown and described a specific embodiment of my invention, I am fully aware that other embodiments thereof are possible. My invention, therefore, is not to be restricted except insofar as is necessitated by the prior art and by the spirit of the following claims.

I claim:

1. In a device of the character described, the combination of a first switch and a second switch, means for closing said switches in alternation; electrical operating means, a wire connection extending between said operating means and an electrical supply system, a reciprocating driven element adapted to be reciprocated by said operating means, a two-circuit switch having two pairs of terminals, means associated with said operating means for completing a circuit through said pairs of terminals in alternation, a wire connection extending between one of the terminals of said first pair and said operating means and also one of the terminals of the second pair, a wire connection extending between the other terminal of the first pair and one side of said second switch, a wire connection extending between the other terminal of the second pair and one side of the first switch, and a wire connection extending between the other side of the first switch and the other side of the second switch and also the electrical supply system.

2. In a device of the character described, the combination of a first switch and a second switch, means for closing said switches in alternation, electrical operating means, a wire connection extending between said operating means and an electrical supply system, a shaft adapted to be driven by said operating means, a reciprocating driven element reciprocated by rotative movement of said shaft, a two-circuit switch having two pairs of terminals, means operated by said shaft for completing a circuit through said pairs of terminals in alternation, a wire connection extending between one of the terminals of said first pair and said operating means and also one of the terminals of the second pair, a wire connection extending between the other terminal of the first pair and one side of said second switch, a wire connection extending between the other terminal of the second pair and one side of the first switch, and a wire connection extending between the other side of the first switch, and the other side of the second switch and also the electrical supply system.

3. In a device of the character described, the combination of an oscillatable support, two switches carried thereby, two terminals for the first one of said switches, two terminals for the other of said switches, electrical operating means, a wire connection extending between said operating means and an electrical supply system, a shaft adapted to be driven by said operating means, a reciprocating driven element reciprocated by rotative movement of said shaft, a two-circuit switch having two pairs of terminals, means operated by said shaft for completing a circuit through said pairs of terminals in alternation, a wire connection extending between one of the terminals of said first pair and said operating means and also one of the terminals of said second pair, a wire connection extending between the other terminal of the first pair and one of the terminals of the second mentioned switch, a wire connection extending between the other terminal of the second pair and one of the terminals of the first mentioned switch, and a wire connection extending between the other terminal of the first mentioned switch and the other terminal of said second mentioned switch and also the electrical supply system.

4. In a device of the character described, the combination of an oscillatable support, two mercury switches carried thereby, two terminals at one end of the first one of said switches, two terminals at the opposite end of the second one of said switches, electrical operating means, a wire connection extending between said operating means and an electrical supply system, a shaft adapted to be driven by said operating means, a reciprocating driven element reciprocated by rotative movement of said shaft, a pivotally mounted support, means carried by said shaft for tilting said support alternately in opposite directions, a two-circuit mercury switch tube mounted on said support, two terminals at one end of said tube, two terminals at the other end of said tube, a wire connection extending between one of the terminals of the first end of said tube and said operating means and also one of the terminals of the second end of said tube, a wire connection extending between the other terminal of the first end of said tube and one of the terminals of said second mercury switch, a wire connection extending between the other terminal of the second end of said tube and one of the terminals of said first mercury switch, and a wire connection between the other terminal of said first mercury switch and the other terminal of said second mercury switch and also the electrical supply system.

5. In a device of the character described, the combination of an oscillatable support, two mercury switches carried thereby, two terminals at one end of the first one of said switches, two terminals at the opposite end of the second one of said switches, electrical operating means, a wire connection extending between said operating means and an electrical supply system, a shaft adapted to be driven by said operating means, a reciprocating driven element reciprocated by rotative movement of said shaft, a segment secured to an end of said shaft, an arm adjustably secured to said segment, flanges on the ends of said arm extending in opposite directions therefrom, a pivotally mounted support adapted to be tilted by said flanges alternately in opposite directions, a two-circuit mercury switch tube mounted on said support, two terminals at one end of said tube, two terminals at the other end of said tube, a wire connection extending between one of the terminals of the first end of said tube and said operating means and also one of the terminals of the second end of said tube, a wire connection extending between the other terminal of the first end of said tube and one of the terminals of said second mercury switch, a wire connection extending between the other terminal of the second end of said tube and one of the terminals of said first mercury switch, and a wire connection between the other terminal of said first mercury switch and the other terminal of said second mercury switch and also the electrical supply system.

WILLIS L. WHITSON.